Oct. 7, 1947.  G. A. MOORE  2,428,676
INSERT FOR MOLDED PLASTIC OBJECTS
Filed Aug. 25, 1944
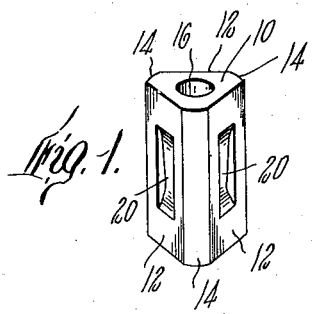
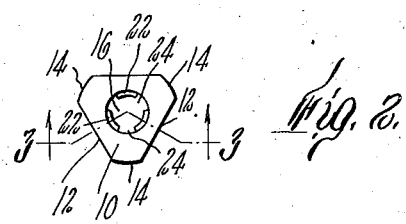
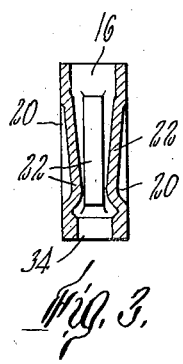
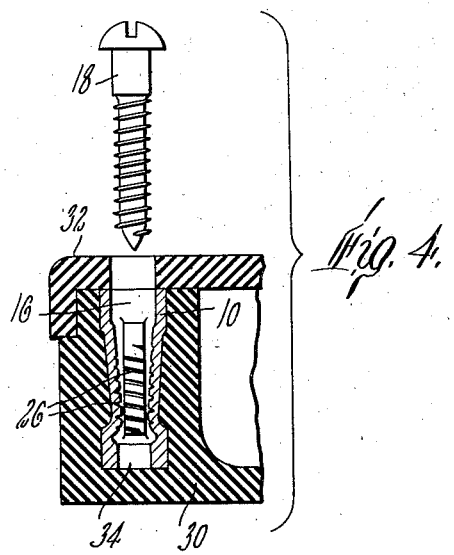
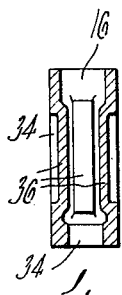
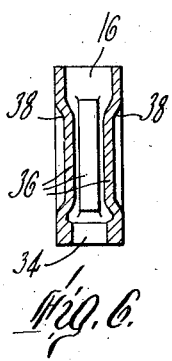
Inventor
George A. Moore Patented Oct. 7, 1947

2,428,676

UNITED STATES PATENT OFFICE 2,428,676

INSERT FOR MOLDED PLASTIC OBJECTS

George A. Moore, Medford, Mass.; George A. Moore, Jr., Harrington Moore, and Lawrence Moore executors of said George A. Moore, deceased Application August 25, 1944, Serial No. 551,171

4 Claims. (Cl. 85—2.4)

This invention relates to inserts adapted to be embedded in molded plastic objects and to receive screws, bolts or the like.

It is often desirable to secure molded plastic objects by means of screws, e. g., a plastic box and its cover. For this purpose the plastic material itself can be drilled to receive the screws, but the hold is somewhat insecure owing to the weakness of the plastic screw-threads, and the plastic is liable to wear rapidly if the screws have to be removed and replaced a number of times. This difficulty may be overcome by embedding in the plastic as it is molded a metal insert to receive a screw or the like. It is an object of the present invention to provide an improved insert for such a purpose. More particularly, it is an object of the invention to provide an insert of the kind which is adapted to be threaded by the screw which is rotatively driven thereinto, this insert having certain novel improvements in structure.

For a more complete understanding of the invention, reference may be had to the following description of certain embodiments thereof, and to the drawing, of which:

Figure 1 is perspective view of an insert embodying the invention.

Figure 2 is an end view of the same.

Figure 3 is a section on the line 3—3 of Figure 2.

Figure 4 is a sectional view of an insert embedded in a plastic object, and a screw adapted to cooperate therewith.

Figures 5 and 6 are longitudinal sectional views of modified forms of the invention.

Inserts embodying the invention are preferably made of a metal or alloy which is softer than iron so that an iron screw which is rotatively driven thereinto can readily cut a screw-thread in the interior of the insert.

Figures 1–3 illustrate an insert 10 of prismatic shape, the cross-section of which is a truncated triangle so that the insert has three major faces 12 and three narrow faces 14. A longitudinal bore 16 extends through the insert with its axis parallel to the faces 12 and 14. This bore has a diameter slightly greater than the maximum shank diameter of the size of screw 18 which it is designed to receive.

According to the invention, an elongated indentation 20 is swaged in each of one or more of the major faces 12, each such indentation resulting in a corresponding longitudinal boss or rib 22 in the bore 16. Thus, in the insert illustrated in Figure 2, there are three ribs 22, spaced by longitudinal channels 24. When a screw 18 is rotatively driven into the bore 16 the thread of the screw will encounter the ribs 22 and will have to cut segments of a complementary thread therein as indicated at 26 in Figure 4. The indentations 20, and consequently the ribs 22, are preferably inclined in depth, as indicated in Figures 3 and 4, so that the initial thread-cutting by the screw is relatively easy. The channels 24 provide spaces to receive metal distorted by the formation of the screw thread and any chips which may be produced when the thread is being cut by the screw 18. Thus undesirable binding or sticking of the screw is avoided, and the thread can be cut without requiring such force as might injure the screw 18 or the molded object 30 in which the insert is embedded. The molded object 30 illustrated by way of example in Figure 4 is a box having a cover 32 to be secured thereon by one or more screws 18.

A slightly modified form of the invention is shown in Figure 5 wherein the indentations 34 and corresponding ribs 36 are not longitudinally inclined but are parallel with the axis of the bore 16. The form shown in Figure 6 is somewhat similar to that in Figure 5 except that the end portions of the indentations and ribs are inclined as at 38 so as to present less abrupt shoulders to the screw 18 when it enters the bore and engages the ribs. The insert is devoid of any split in the walls thereof. Hence the device is substantially non-expansible as compared with longitudinally split devices designed to receive screws, wedges or the like and to be spread or expanded thereby.

When the plastic object is molded with inserts therein, the plastic material enters the indentations 20 and locks the inserts against axial or rotary movement. The cross-sectional shape of the insert serves to anchor it more securely against the considerable torque impressed thereon when the first screw is being driven into its bore to cut a thread therein. The cross-sectional shapes which can be employed are many, a non-circular shape being preferred, including oval and polygonal shapes.

When a plastic object is being molded with one or more inserts therein, it is necessary to prevent the entry of the plastic while in fluid condition into the interior of the inserts. To avoid such entry the inserts may be provided with temporary plugs (not shown) which may consist of cylindrical metal pegs having a diameter to engage the ribs 22 when the plug is thrust into the bore. In order that the lower end of the bore will be fully closed by the plug, the bore is drilled in two stages, the lower portion being of smaller diameter than the upper portion which extends for most of the length of the insert. The lower portion of the bore defines a cylinder which is tangent to the ribs 22. That is, each rib is spaced from the axis of the bore by a distance substantially equal to the radius of the lower or reduced portion of the bore. Thus a plug which is just small enough in diameter to pass down through the space between the ribs will fit closely in the lower portion of the bore and will thus serve to prevent entry of fluid plastic into the interior of the insert when the plastic article is molded.

I claim:

1. A metal insert for a molded plastic object, comprising a prismatic block of metal with an axial bore therethrough and a plurality of side faces but no longitudinal split therein, said block having elongated indentations in the side faces of the block between points spaced from the ends thereof defining corresponding internal ribs within the bore in spaced relation to receive a screw rotatively driven into the bore.

2. A metal insert for molded plastic objects, comprising a metal block having no longitudinal split therein, said block having a central bore therethrough and elongated lateral external indentations extending lengthwise of the bore defining corresponding internal bosses within said bore adapted to be cut by a screw of harder metal rotatively driven into the bore to form segments of a screw thread in said bosses.

3. A metal insert for molded plastic objects, comprising a metal block having no longitudinal split therein, said block having a central bore therethrough and elongated lateral external indentations extending lengthwise of the bore defining corresponding internal bosses within said bore, said bosses being formed with a slight convergence toward the axis of the bore.

4. A metal insert for molded plastic objects, comprising a prismatic block having no longitudinal split therein, said block having an axial bore therethrough with an end portion of reduced diameter, said block having elongated external indentations extending longitudinally thereof defining corresponding internal bosses within said bore, each of said bosses being spaced from the axis of the bore by a distance substantially equal to the radius of the reduced portion of the bore.

GEORGE A. MOORE.

REFERENCES CITED

The following references are of record in the file of this patent:

UNITED STATES PATENTS

| Number | Name | Date |
|---|---|---|
| 1,963,301 | Gloystein | June 19, 1934 |
| 1,476,835 | Pleister | Dec. 11, 1923 |
| 1,751,818 | Karitzky | Mar. 25, 1930 |
| 1,752,752 | Ogden | Apr. 1, 1930 |
| 991,517 | Kennedy | May 9, 1911 |
| 2,333,388 | Poupitch | Nov. 2, 1943 |

FOREIGN PATENTS

| Number | Country | Date |
|---|---|---|
| 420,518 | France | Feb. 1, 1911 |
| 297,521 | Great Britain | Sept. 27, 1928 |